(12) United States Patent
Brecht et al.

(10) Patent No.: US 6,481,544 B2
(45) Date of Patent: *Nov. 19, 2002

(54) DISK BRAKE AND BRAKE SHOE SET FOR A DISK BRAKE

(75) Inventors: Joerg-Dieter Brecht, Odenthal (DE); Karl-Heinz Oehl, Cologne (DE)

(73) Assignee: TMD Friction GmbH, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,416

(22) PCT Filed: Jan. 10, 1998

(86) PCT No.: PCT/EP98/00118

§ 371 (c)(1),
(2), (4) Date: Oct. 21, 1999

(87) PCT Pub. No.: WO98/48193

PCT Pub. Date: Oct. 29, 1998

(65) Prior Publication Data

US 2002/0000349 A1 Jan. 3, 2002

(30) Foreign Application Priority Data

Apr. 24, 1997 (DE) .......................................... 197 17 393

(51) Int. Cl.[7] .............................................. F16D 65/00
(52) U.S. Cl. .................................. 188/250 E; 188/73.1
(58) Field of Search ......................... 188/250 B, 250 E, 188/250 G, 73.1, 73.37

(56) References Cited

U.S. PATENT DOCUMENTS

| | | | | |
|---|---|---|---|---|
| 4,705,146 A | * | 11/1987 | Tarter | 188/73.1 |
| 5,145,037 A | * | 9/1992 | Kobayashi et al. | 188/73.1 |
| 5,443,133 A | * | 8/1995 | Dreilich et al. | 188/250 G |
| 5,456,339 A | * | 10/1995 | Zeng | 188/250 E |
| 5,535,859 A | * | 7/1996 | Zeng | 188/250 B |
| 5,730,257 A | * | 3/1998 | Clark | 188/73.1 |

* cited by examiner

Primary Examiner—Christopher P. Schwartz
Assistant Examiner—Bradley King
(74) Attorney, Agent, or Firm—Diller, Ramik & Wight

(57) ABSTRACT

A disk brake and brake pad set that includes a brake disk (2) and two brake pads (4, 6) wherein each brake pad (4, 6) has a carrier plate (8) and a friction lining layer (10, 12) arranged on the carrier plate (8). Each friction lining layer (10, 12) has a central area (22) of identical layer thickness, an area (14, 16; 18, 20) of reduced layer thickness at at least one end of the brake pad (4, 6), and a separating line (24) that defines an edge between the central area (22) and the at least one area (14, 16; 18, 20) of reduced layer thickness. When the two brake pads (4, 6) are arranged opposite each other on either side of the brake disk (2) the areas (14, 16; 18, 20) of reduced layer thickness of the friction lining layers (10, 12) are tangential to the brake disk (2) and the areas (14, 16; 18, 20) of reduced layer thickness of the friction lining layers (10, 12) and the separating lines (24) are arranged asymmetrically relative to each other.

10 Claims, 4 Drawing Sheets

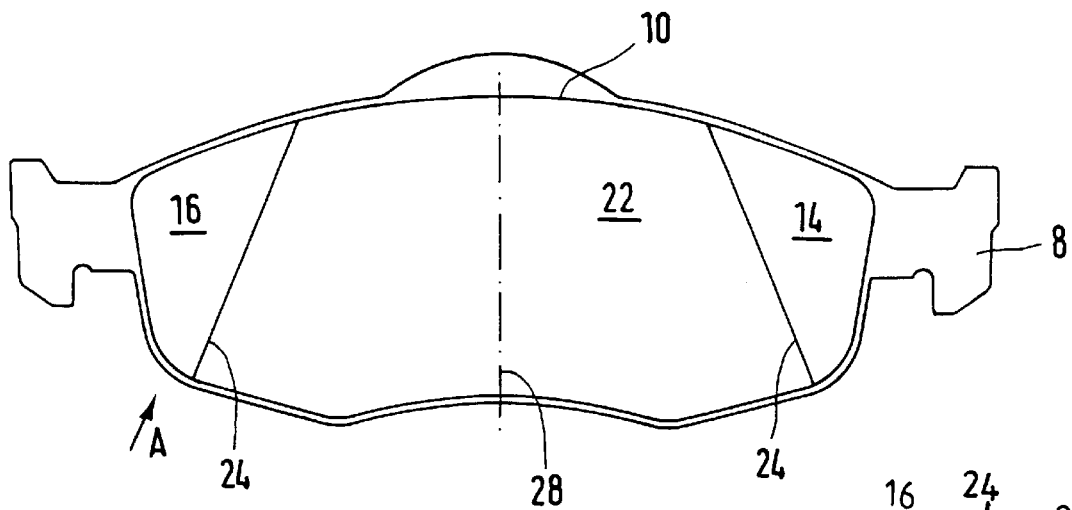
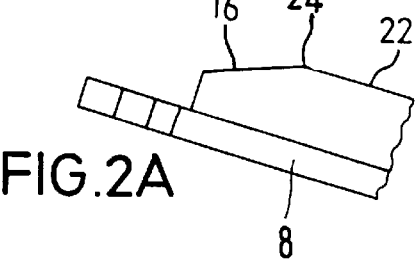
FIG.2
FIG.2A
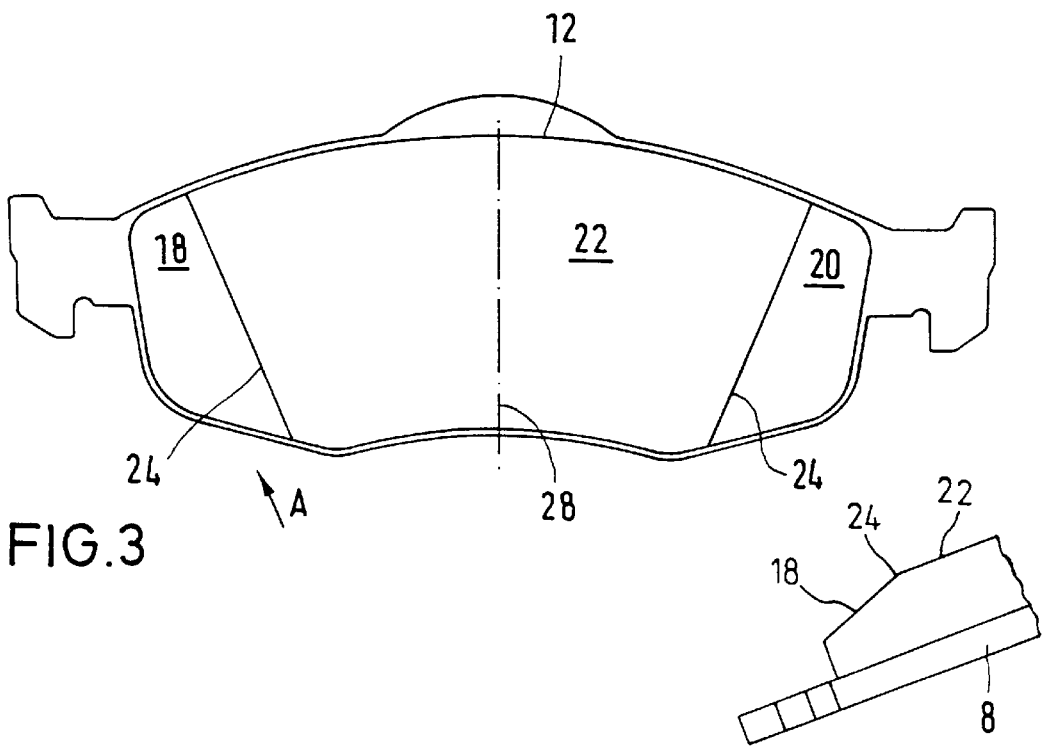
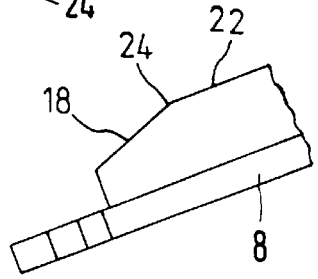
FIG.3
FIG.3A

DISK BRAKE AND BRAKE SHOE SET FOR A DISK BRAKE

BACKGROUND OF THE INVENTION

The invention relates to a disk brake and a brake pad set for a disk brake.

Such disk brakes are required in the vehicle sector. It is common practice to configure the friction linings fastened to the carrier plates of the brake pads with bevelled faces, i. e. not with surfaces extending parallel to the brake disk or the carrier plate.

The brake pads fixed on either side of the disk brake have friction linings with bevelled surfaces of mirror-inverted arrangement.

Disk brakes are complex, oscillatory systems which are excited to oscillate by the friction forces acting in the contact surfaces between the friction linings and the brake disk.

On of these oscillation problems is the so-called creaking of brakes. This phenomenon is due to low-frequency oscillations in the frequency range from approximately 20 to 150 Hz occurring during the transition from adherence to friction and at an extremely low velocity of the vehicle. Creaking of the brakes occurs in particular in high-duty vehicles with automatic gearbox due to the driving torque being permanently applied to the drive shaft.

In the past few years oscillation problems have to a growing extent been encountered in the automotive sector. One reason for this is the consequent realization of light-weight construction and cost reduction concepts. On the other hand, the vehicle buyers make increasing demands on the comfort to be offered by a vehicle and require the disturbing driving noises to be eliminated.

The so-called slip stick effect is blamed for the occurrence of the creaking noises. The slip stick effect is the alternate adherence and sliding of the friction linings to/on the brake disk.

In the vehicle creaking occurs in two different situations. A typical case, which frequently occurs in high-duty vehicles with automatic gearbox, is release of the vehicle brake with a driving torque being applied. If a driving torque acts upon the drive shaft while a vehicle stands still with the brake being applied, slow release of the brake may cause a clearly audible crack or even a penetrating buzzing noise. The driving torque needs not necessarily be generated by the engine, it may also be produced by a gravitational force occurring when the vehicle is in downhill position. In this case, too, the brake creaks if it is slowly released and a certain critical contact pressure of the brake lining has been reached. The buzzing noise described may occur during uniform and slow movement of the vehicle and constant contact pressure for an extended period of time.

Even when the vehicle is braked at higher velocities a short creaking noise may be audible during the transition from friction to adherence immediately before the vehicle stops.

SUMMARY OF THE INVENTION

It is the object of the invention to provide a disk brake or a brake pad set for a disk brake by means of which occurrence of low-frequency noises is to be prevented.

The invention provides in a preferable manner for the friction linings of the brake pads to comprise areas of reduced layer thickness which are not of mirror-inverted arrangement in the brake pads in relation to the brake disk.

Since the friction linings relative to a plane in the brake disk are not arranged mirror-symmetrically, either side of the brake disk presents different frictional forces thereby inducing different oscillations on either side of the brake disk, which affects the self-excitation of the oscillation and thus the suppresses occurrence of low-frequency oscillations in the frequency range from 150 Hz, and in particular resonance phenomena.

The bevelled friction linings are configured so that the areas of reduced layer thickness have a surface inclined towards the carrier plates and incline, e. g. at an angle of approximately 10 to 45° to the carrier plate, tangentially to the outside in the direction of the carrier plate.

The separating line between the areas of the friction lining layer with identical layer thickness and the areas of reduced layer thickness may extend in parallel to the symmetrically bisecting line of the brake disk, which extends in radial direction of the brake disk, or at an angle to said symmetrically bisecting line. The angle to said symmetrically bisecting line may be in the range from ±0 to 60°, preferably in the range between ±10 and 30°.

For example, in the case of brake pad pairs located opposite each other it is envisaged that said separating line extends in opposite direction on both sides of the brake disk and thus not mirror-symmetrically.

Hereunder embodiments of the invention are explained in detail with reference to the drawings in which:

BRIEF DESCRIPTION OF THE DRAWINGS

FIG. 2 illustrates a piston-side brake pad, FIG. 2A is an enlarged fragmentary elevational view looking along arrow A of FIG. 2, FIG. 3 illustrates the brake pad complementary to the brake pad of FIG. 2, FIG. 3A is an enlarged fragmentary elevational view looking along arrow A of FIG. 3.

DESCRIPTION OF THE PREFERRED EMBODIMENTS

Figure 1:
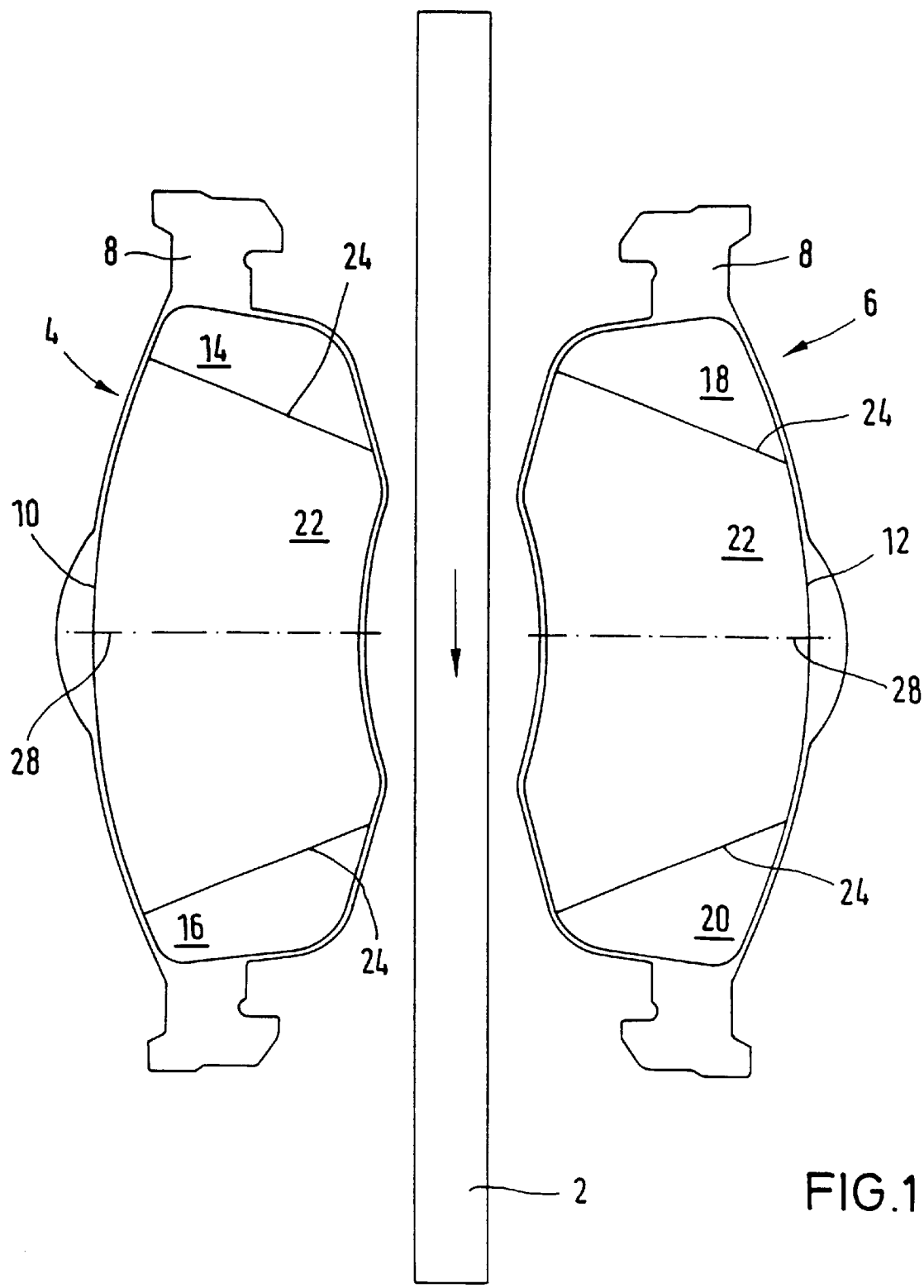
FIG. 1 illustrates a first embodiment of a brake pad set for a disk brake with the brake pads being, for clarity's sake, unfolded by 90° to the outside into the drawing plane.

In FIG. 1 the brake disk 2 rotating during driving operation is arranged between the brake pads 4, 6. To illustrate the friction lining surface the brake pads 4, 6 are folded to the outside by 90° out of its normally parallel position to the brake disk 2.

The friction lining of each brake pad 4,6 comprises a central area 22 located between separating lines 24, 24 which is of a constant layer thickness or a layer thickness slightly reducing towards the outlet end of the brake pad. Such a slightly inclined friction lining surface in the central area 22, which is not shown in the drawings, prevents squealing caused by friction by shifting of the center of pressure. The friction lining layers 10, 12 comprise at the ends of the brake pads 4, 6 areas of reduced layer thickness 14, 16, 18, 20 which are not arranged mirror-symmetrically in the brake pads 4, 6 in relation to a mirror plane extending longitudinally to the brake disk 2. In other words, the separating lines 24, 24 of the two brake pads 4, 6 are arranged asymmetrically in angularly offset crossing relationship relative to each other on opposite sides of the brake disk 2. This prevents the self-excitation of braking oscillations, in particular oscillations in the frequency range from approximately 20 to 150 Hz. The bevelled faces of friction linings located opposite each other are thus arranged in different ways thus preventing regular scoring on the brake disk 2, which would occur in the case of mirror-inverted arrangement of the friction lining. The slip stick effects known as creaking of brakes with simultaneous tilting of the friction linings at low velocities of the vehicle are reliably prevented.

FIGS. 2 and 3 illustrate a brake pad pair with FIG. 2 showing the piston-side brake pad and FIG. 3 the brake pad on the opposite side. In the embodiment the bevel of the area of reduced layer thickness extends at an angle of 20° to the friction lining surface in the central area 22 or to the carrier plate 8. Said bevel of the areas 14, 16, 18, 20 may extend at an angle ranging between approximately 10 and 45°. The separating line between the central area 22 of the friction lining layers 10, 12 and the area of reduced layer thickness extends at an angle of approximately ±22° to the radial symmetrically bisecting line 28 of the brake pads 4, 6. The separating line may also extend at an angle ranging between ±0 and 60°, preferably ±10 and 30°.

Figure 4:
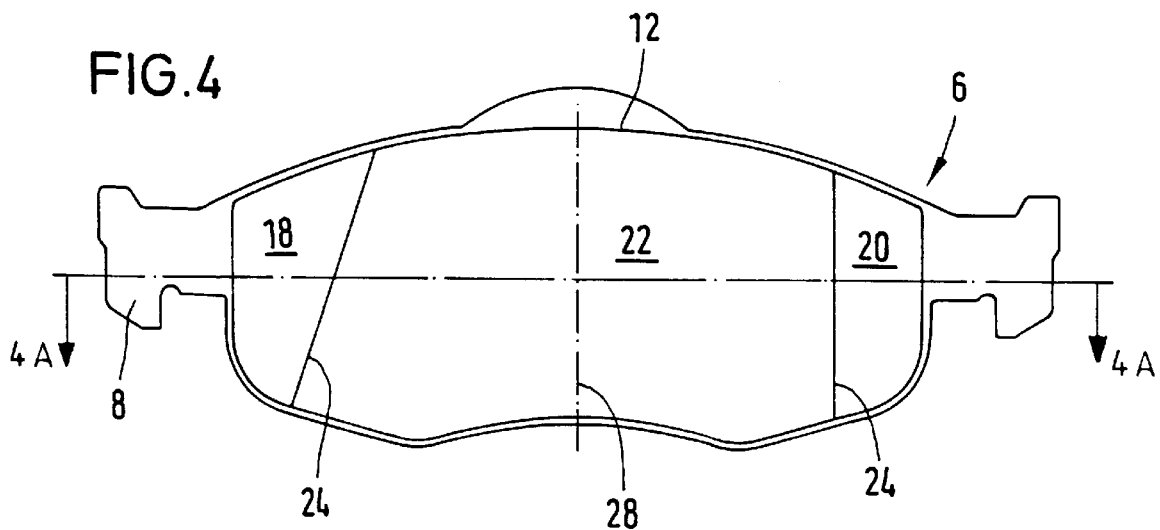
FIG. 4 is a top plan view of another brake pad.
Figure 4A:
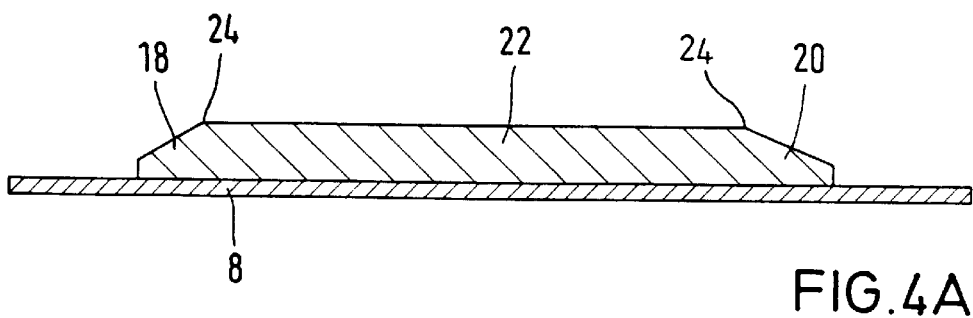
FIG. 4A is an enlarged cross-sectional view of the brake pad of FIG. 4 taken along line 4A—4A thereof.
Figure 5:
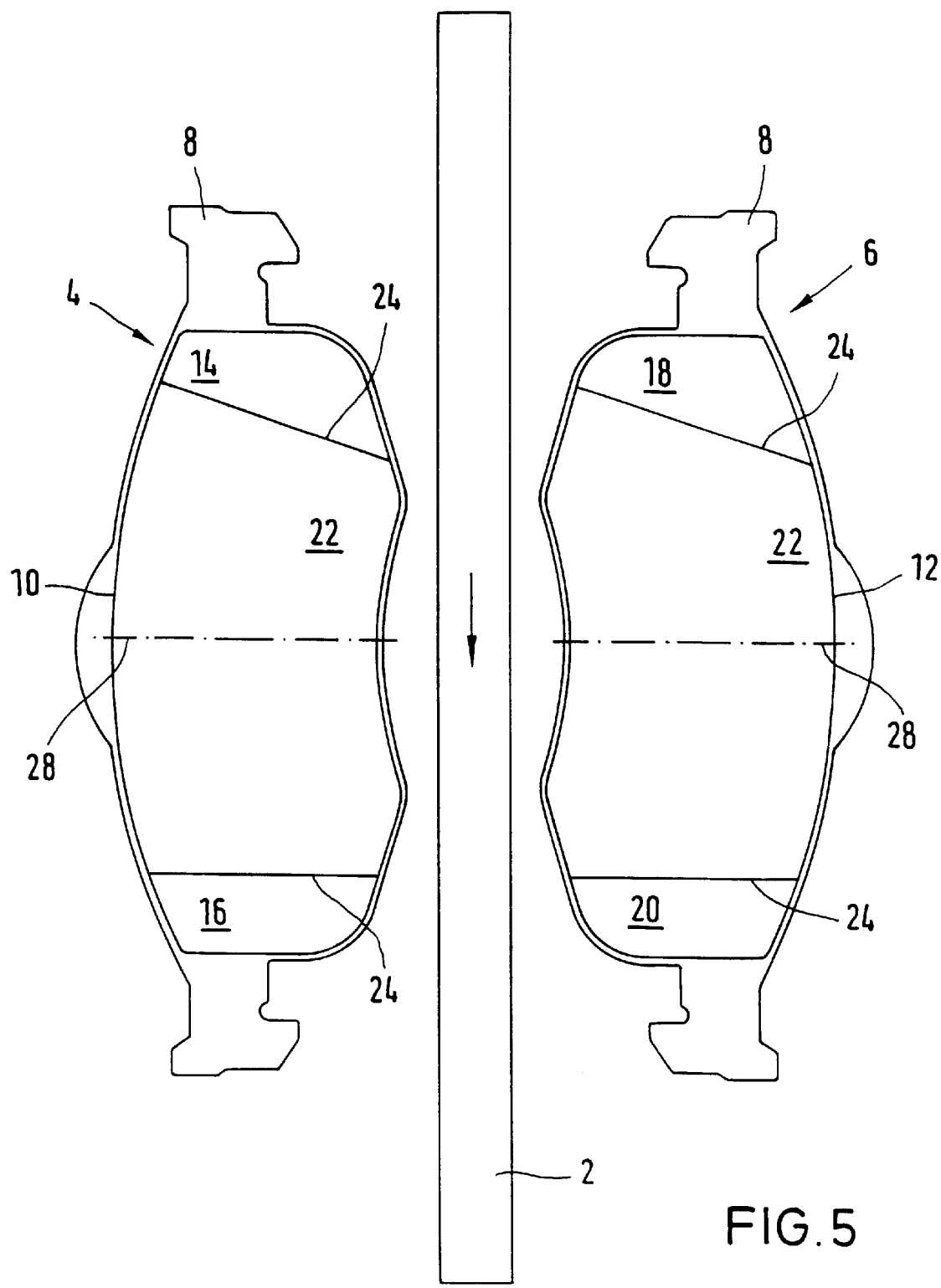
FIG. 5 is a schematic view of a pair of the brake pads of FIG. 4 and associated brake disk.

FIG. 4 illustrates an alternative embodiment of a brake pad on the opposite side, a section along a section line extending orthogonally to the symmetrically bisecting line 28, and FIG. 5 shows a schematic representation of the brake pad pair of FIG. 4 in a representation similar to that of FIG. 1.

Although a preferred embodiment of the invention has been specifically illustrated and described herein, it is to be understood that minor variations may be made in the apparatus without departing from the spirit and scope of the invention, as defined the appended claims.

We claim:

1. A disk brake comprising a brake disk (2) and two brake pads (4, 6), each brake pad (4, 6) including a carrier plate (8) and a friction lining layer (10, 12) arranged thereupon, each friction layer (10, 12) including a radial symmetrically bisecting line (28); each friction layer (10, 12) having a central area (22) of a substantially uniform layer thickness and an outer friction surface and an area (14, 16; 18, 20) of reduced layer thickness at at least one end of the brake pad (4, 6) with the reduced thickness layer area having an outer friction surface; a separating line (24) defining an edge (24) between the central area (22) and the at least one reduced thickness layer area (14, 16; 18, 20) of each brake pad (4, 6), said separating line (24) and said radial symmetrically bisecting line (28) defining an acute included angle, said reduced thickness layer area (14, 16; 18, 20) progressively reducing in thickness in a direction away from said separating line (24), and said separating lines (24, 24) of the two brake pads (4, 6) being arranged asymmetrically in angularly offset crossing relationship relative to each other on opposite sides of said brake disk (2).

2. The disk brake as defined in claim 1 wherein each friction layer (10, 12) includes a second area (14, 16 or 18, 20) of reduced layer thickness at a second end of each brake pad (4, 6) opposite each brake pad one end, each second reduced thickness layer area having an outer friction surface, a second separating line (24) defining a second edge (24) between each central area (22) and the second reduced thickness layer area (14, 16 or 18, 20), said second separating line (24) and said radial symmetrically bisecting line (28) defining a second acute included angle, said second reduced thickness layer area (14, 16 or 18, 20) progressively reducing in thickness in a direction away from said second separating line (24), and said second separating lines (24, 24) of the two brake pads (4, 6) being arranged asymmetrically in angularly offset crossing relationship relative to each other on opposite sides of said brake disk (2).

3. The disk brake as defined in claim 1 wherein said radial symmetrically bisecting line (28) substantially bisects each central area (22).

4. The disk brake as defined in claim 1 wherein said friction lining layers (10, 12) each include a radially outermost edge and a radially innermost edge, and said separating line (24) and said radial symmetrically bisecting line (28) converge in a direction toward one of and away from another of said radially outermost and innermost edges.

5. The disk brake as defined in claim 1 wherein said included angle is in the range of substantially between 1020 to 30°.

6. The disk brake as defined in claim 2 wherein said radially symmetrically bisecting line (28) substantially bisects each central area (22).

7. The disk brake as defined in claim 2 wherein said friction lining layers (10, 12) each include a radially outermost edge and a radially innermost edge, and said separating line (24) and said radially symmetrically bisecting line (28) converge in a direction toward one of and away from another of said radially outermost and innermost edges.

8. The disk brake as defined in claim 3 wherein said friction lining layers (10, 12) each include a radially outermost edge and a radially innermost edge, and said separating line (24) and said radially symmetrically bisecting line (28) converge in a direction toward one of and away from another of said radially outermost and innermost edges.

9. A disk brake comprising a brake disk (2) and two brake pads (4, 6), each brake pad (4, 6) including a carrier plate (8) and a friction lining layer (10, 12) arranged thereupon, each friction layer (10, 12) including a radial symmetrically bisecting line (28); each friction layer (10, 12) having a central area (22) of a substantially uniform layer thickness and an outer friction surface and an area (14, 16; 18, 20) of reduced layer thickness at at least one end of the brake pad (4, 6) with the reduced thickness layer area having an outer friction surface; a separating line (24) defining an edge (24) between the central area (22) and the at least one reduced thickness layer area (14, 16; 18, 20) of each brake pad (4, 6), said separating line (24) and said radial symmetrically bisecting line (28) defining an acute included angle, said reduced thickness layer area (14, 16; 18, 20) progressively reducing in thickness in a direction away from said separating line (24), said separating lines (24, 24) of the two brake pads (4, 6) being arranged asymmetrically in angularly offset crossing relationship relative to each other on opposite sides of said brake disk (2), each friction layer (10, 12) includes a second area (14, 16 or 18, 20) of reduced layer thickness at a second end of each brake pad (4, 6) opposite each brake pad one end, each second reduced thickness area having an outer friction surface, a second separating line (24) defining a second edge (24) between each central area (22) and the second reduced thickness layer area (16, 20), said second separating line (24) and said radial symmetrically bisecting line (28) being in substantially parallel relationship to each other, said second reduced thickness layer area (16, 20) progressively reducing in thickness in a direction away from said separating line (24), and said second separating lines (24, 24) of the two brake pads (4, 6) being arranged in substantially superimposed relationship relative to each other on opposite sides of said brake disk (2).

10. A brake pad set comprising two brake pads (4, 6), each brake pad (4, 6) including a carrier plate (8) and a friction lining layer (10, 12) arranged thereupon, each friction layer (10, 12) including a radial symmetrically bisecting line (28); each friction layer (10, 12) having a central area (22) of a substantially uniform layer thickness and an outer friction surface and an area (14, 16; 18, 20) of reduced layer thickness at at least one end of the brake pad (4, 6) with the reduced thickness layer area having an outer friction surface; a separating line (24) defining an edge (24) between the central area (22) and the at least one reduced thickness layer area (14, 16; 18, 20) of each brake pad (4, 6), said separating line (24) and said line (28) defining an acute included angle, said reduced thickness layer area (14, 16; 18, 20) progressively reducing in thickness in a direction away from said separating line (24), said separating lines (24, 24) of the two brake pads (4, 6) being arranged asymmetrically in angularly offset crossing relationship relative to each other when located at opposite sides of a brake disk, each friction layer (10, 12) includes a second area (14, 16 or 18, 20) of reduced layer thickness at a second end of each brake pad (4, 6) opposite each brake pad one end, each second reduced thickness area having an outer friction surface, a second separating line (24) defining a second edge (24) between each central area (22) and the second reduced thickness layer area (16, 20), said second separating line (24) and said radial symmetrically bisecting line (28) being in substantially parallel relationship to each other, said second reduced thickness layer area (16, 20) progressively reducing in thickness in a direction away from said separating line (24), and said second separating lines (24, 24) of the two brake pads (4, 6) being arranged in substantially superimposed relationship relative to each other on opposite sides of said brake disk (2).

* * * * *